US006896113B2

(12) United States Patent
Kramer

(10) Patent No.: US 6,896,113 B2
(45) Date of Patent: May 24, 2005

(54) MANUALLY OPERATED TOOL

(75) Inventor: Jochen Kramer, Waiblingen (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 10/319,759

(22) Filed: Dec. 13, 2002

(65) Prior Publication Data

US 2003/0111315 A1 Jun. 19, 2003

(30) Foreign Application Priority Data

Dec. 17, 2001 (DE) ........................................ 101 61 908

(51) Int. Cl.[7] ................................................ F16D 43/18

(52) U.S. Cl. .............. 192/105 BA; 192/76; 192/110 R; 192/110 S

(58) Field of Search ...................... 192/105 R, 105 BA, 192/105, 110 R, 110 S, 76, 110 B; 30/216

(56) References Cited

U.S. PATENT DOCUMENTS 3,785,465 A * 1/1974 Johansson ............. 192/105 BA
3,991,864 A * 11/1976 Muller ................. 192/105 BA
4,140,209 A * 2/1979 Muller ................. 192/105 BA
4,889,215 A 12/1989 Ohkanda
4,949,826 A * 8/1990 Ohkanda .............. 192/105 CE
5,014,835 A * 5/1991 Nagashima et al. ....... 192/48.5
5,483,931 A 1/1996 Stoll et al.
5,845,757 A 12/1998 Csonka
6,021,757 A * 2/2000 Nagashima ................. 123/400
6,101,991 A 8/2000 Glover
6,578,270 B2 6/2003 Hiratsuna et al.

* cited by examiner

*Primary Examiner*—Saul Rodriguez
(74) *Attorney, Agent, or Firm*—Robert W. Becker & Associates; Robert W. Becker

(57) ABSTRACT

A manually guided implement is provided and has an internal combustion engine and a power take-off housing to which the engine is secured. A centrifugal clutch is provided for achieving a positive connection, as a function of engine speed, between a drive part, which is driven by the engine and is rotatably mounted on the engine side, and a power take-off part that is rotatably mounted in the housing. The clutch has at least one centrifugally actuatable clutch body in the region of the drive part, and in the region of the power take-off part has a clutch housing that overlaps the clutch body. The clutch furthermore has a locating bearing that is disposed between and coaxial with the drive part and the power take-off part. Locating pins are provided for aligning the engine relative to the housing, with the pins extending with play into appropriate receiving openings.

10 Claims, 5 Drawing Sheets

3 4 5 6 7 8 11 12 14 17 35 36 37 38 39 44 13 6

1
2
3
4
5
6
7
8
10
14
15
21
22
23
25
26
27
28
29
30
31
32
33
34

35
12
36
5
13
42
11
3
37
7
6
6
14
8
44
16
39
15
43
4
38

35
12
36
5
13
3
11
44
17
8
37
7
14
6
6
39
4
38

MANUALLY OPERATED TOOL

BACKGROUND OF THE INVENTION

The invention relates to a manually operated implement or tool, in particular hedge shears, a brush cutter or similar device.

Manually operated tools having an internal combustion engine as the drive engine have, in their drive trains, a centrifugal clutch which is engaged and produces a positive connection between the internal combustion engine and the tool to be driven above a predetermined limit speed. When the internal combustion engine is at idle, the clutch disengages the tool from the drive engine.

On the engine side, the centrifugal clutch has a clutch support which is fixed to a drive part driven by the internal combustion engine and on which is guided at least one centrifugally actuatable clutch body. A drive part to be driven by the internal combustion engine and from which the flow of power runs to the tool to be driven comprises a clutch housing which overlaps the clutch support with the clutch body. The clutch bodies run on the rotationally mounted drive part with the clutch support in such a manner that they can be moved radially outwards against a spring force. When the limit speed is reached, the clutch bodies are forced radially outwardly until their insides come into contact with a peripheral wall of the clutch drum, at which point friction causes a positive connection between the drive part and the power take-off part.

Certain models of manually operated tools are designed such that the power take-off part is mounted in a separate power take-off housing, the internal combustion engine being fastened to the power take-off housing. In such cases, the drive part is mounted on the engine side and generally fastened directly to the crankshaft of the internal combustion engine. Assembly takes place in several stages. First, the engine assembly and the drive part and the power take-off housing and the power-take off part are assembled separately. The engine assembly is then fixed to the power take-off housing. Alignment pins which project with play into corresponding openings are provided to ensure accurate alignment during final assembly. This ensures the accurate alignment of the engine and drive part in relation to the power take-off housing and power take-off part.

Undesirable vibrations and rough engagement and disengagement sometimes referred to as “clutch grabbing” can be observed in tools of this design. Costly of such measures can at least be reduced.

It is therefore an object of the present invention to design a tool of the aforementioned general type in such a manner that it runs more quietly.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
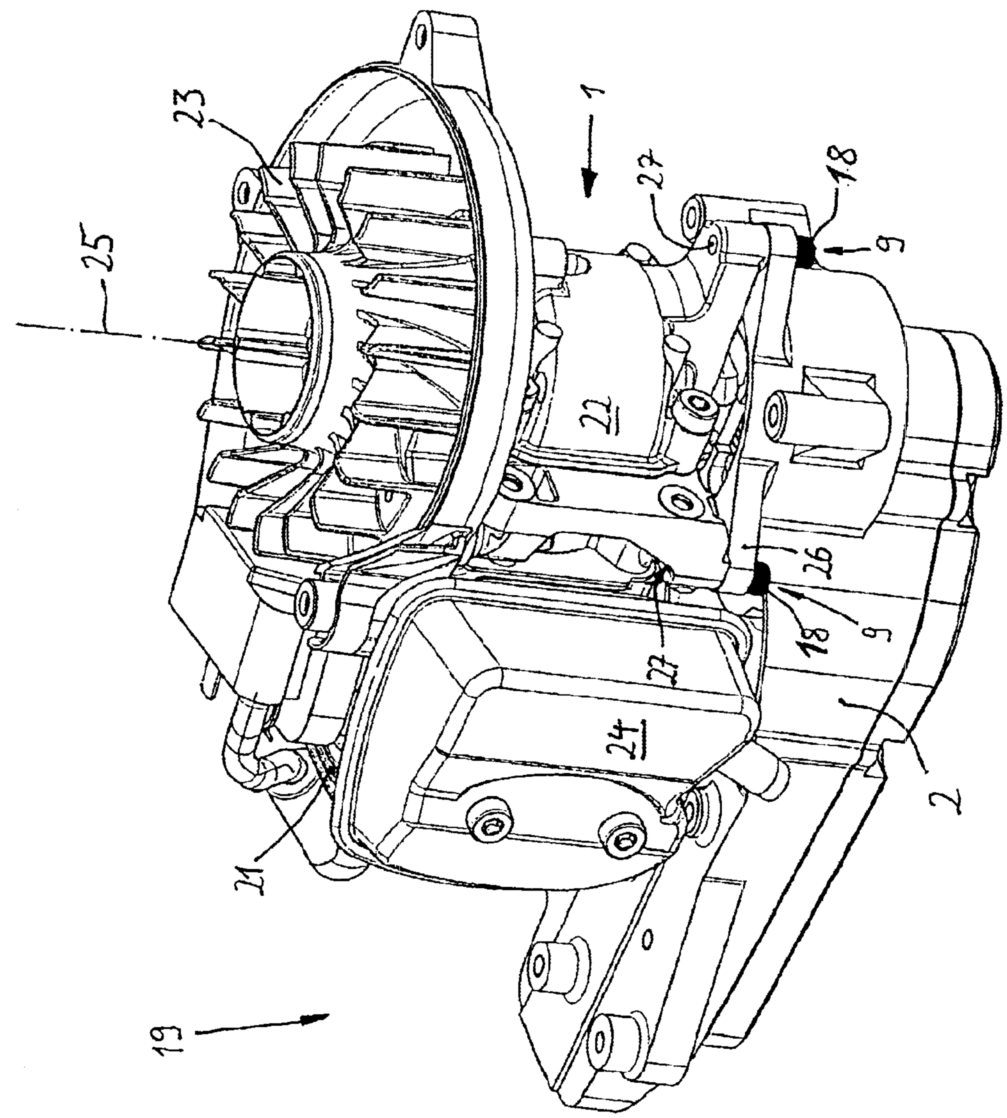
FIG. 1 shows a perspective overview of the essential elements of engine-driven hedge shears.
Figure 1:
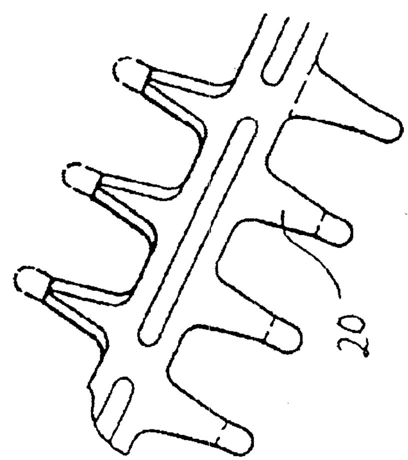

The object of the present invention is realized by a manually guided implement having an internal combustion engine and a power take-off housing to which the engine is secured, the implement further comprising a centrifugal clutch for achieving a positive connection, as a function of engine feed, between a drive part, which driven by the engine and is rotatably mounted on the engine side, and a power take-off part that is rotatably mounted in the housing, wherein the centrifugal clutch is provided with at least one centrifugally actuatable clutch body in the region of the drive part, is further provided, in the region of the power take-off part, with a clutch housing that overlaps the clutch body; in addition, a locating bearing is provided between and coaxial with the drive part and the power take-off part, the drive part and the power take-off part thus being able to rotate exactly coaxially in relation to one another. Locating pins are provided to ensure the rough alignment of the engine in relation to the power take-off housing. However, they project into corresponding receiving openings with play. When the engine is fitted to the power take-off housing, the two sub-assemblies are therefore only roughly aligned. The precise positioning of the clutch support in the clutch drum is effected by the locating bearing. The reference value used for coaxial adjustment is the position of the drive part in relation to that of the power take-off part and thus the position of the clutch body in relation to that of the clutch belt housing. Thus it is possible to equalize process tolerances in the region of the alignment pins and the corresponding receiving openings. The subsequent final assembly, the tightening of the corresponding fastening screws on the engine, for example, creates an intimate connection between the two sub-assemblies, maintaining the accurate alignment previously achieved. The exact coaxiality in the centrifugal clutch ensures low levels of vibration in the drive train. Improved and cleaner engagement and disengagement is also observed. Costly anti-vibration measures which might otherwise be required can thus be dispensed with, or the cost of such measures can at least be reduced.

Accurate alignment by means of the locating bearing directly between the drive and power take-off parts keeps the tolerance limit influencing the true running of the centrifugal clutch low. The spatial proximity of the clutch bodies/clutch drum to the locating bearing produces high coaxiality and running truth and achieves clean engagement and disengagement. Overall, process tolerances have to be respected at only a few points and manufacturing costs are reduced accordingly.

In an advantageous development the power take-off part is mounted in the power take-off housing on two bearings. This provides good bearing rigidity. Once made, the accurate adjustment is therefore insensitive to external mechanical and thermal loads. Here the power take-off in the power take-off part via which the flow of power from the internal combustion engine is conducted to the tool is expediently positioned between the two bearings. Eccentricities in the flow of power and the resulting deformations of the power take-off train are thus kept low which contributes to the further insensitivity of the accurate alignment achieved at the time of assembly.

Various variants of the design of the locating bearing may be useful depending upon the application. In one advantageous variant, the locating bearing is held in the drive part, a locating pin on the power take-off part engaging in the locating bearing. Here the clutch body, inside which there is sufficient space to accommodate the bearing without further modifications, is particularly suitable for receiving the locating bearing. By positioning the locating bearing directly in the clutch support, the chain of tolerances from the locating bearing to the clutch bodies is kept low. In a useful alternative, the locating bearing is held in the power take-off part, a locating pin on the drive part engaging in the locating bearing. This variant is expedient when the design provides sufficient space to receive the locating bearing in the region of the power take-up without further modifications. Here the locating pin is advantageously designed in one piece with the clutch support. As a result, it is possible to achieve high running truth and coaxiality of the locating pin in relation to the clutch bodies in the clutch support in one manufacturing cycle while avoiding joint tolerances.

To achieve low moments of friction in the locating bearing during the movement of the drive part in relation to the power take-off part when disengaged, it may be expedient to design the locating bearing as a roller bearing, in particular a needle roller bearing. The ease of accessibility of the roller bearing enhances a true running of the engine under idling conditions. Where the device is to be used in dirty conditions it is expedient to design the locating bearing as a slide bearing. Even small slide bearings have high bearing capacity and are insensitive to dirt, abrasion dust from the clutch bodies, etc.

To achieve low manufacturing costs and to save component costs, the locating pins are in fact the fastening screws for the internal combustion engine. In order to align the internal combustion engine roughly in relation to the power take-off housing, the fastening screws simply need to be inserted through the receiving openings, the rough alignment thus achieved being sufficiently accurate to enable the locating bearing to be inserted. Subsequently tightening the fastening screws fixes the accurate alignment achieved by means of the locating bearing. The additional cost of separate alignment pins or similar devices is thus avoided.

Further specific features of the present invention will be described in detail subsequently.

DESCRIPTION OF PREFERRED EMBODIMENTS

Referring now to the drawings in detail, FIG. 1 shows a perspective overview of the essential elements of a tool or implement based on the example of hedge shears 19. A shear blade 20 (of which only a section is illustrated) is held in a power take-off housing 2 in which is located an eccentric drive for the blade 20 (not illustrated in greater detail). An internal combustion engine 1 is fixed to the power take-off housing 2 by means of fastening screws. The shear blade 20 can be driven by the internal combustion engine 1.

The internal combustion engine 1 has a cylinder 21 and a crankcase 22 in which is mounted a crankshaft (not illustrated in greater detail) in such a manner that it can be rotated about a crankshaft axis 25. Provided on the same axis as the crankshaft axis 25, in particular in the region of the cylinder 21, is a cooling fan 23 for the internal combustion engine 1. An exhaust muffler is fixed to the cylinder 21.

Tapped holes 27 are made in continuations or extensions of the crankcase 22. The fastening screws 18 are passed through flanges 26 on the power take-off housing 2 to fix the internal combustion engine 1 and are screwed into the tapped holes 27. In addition to the direct screwing of the internal combustion engine 1 to the power take-off housing 2 illustrated, it can also be useful to fix the internal combustion engine 1 in such a manner that the internal combustion engine 1 is held in an engine housing, the engine housing being fixed to the power take-off housing 2 by screws or other means.

The internal combustion engine 1 illustrated is a single-cylinder two-stroke engine. It can also be a four-cycle engine or other internal combustion engine.

Figure 2:
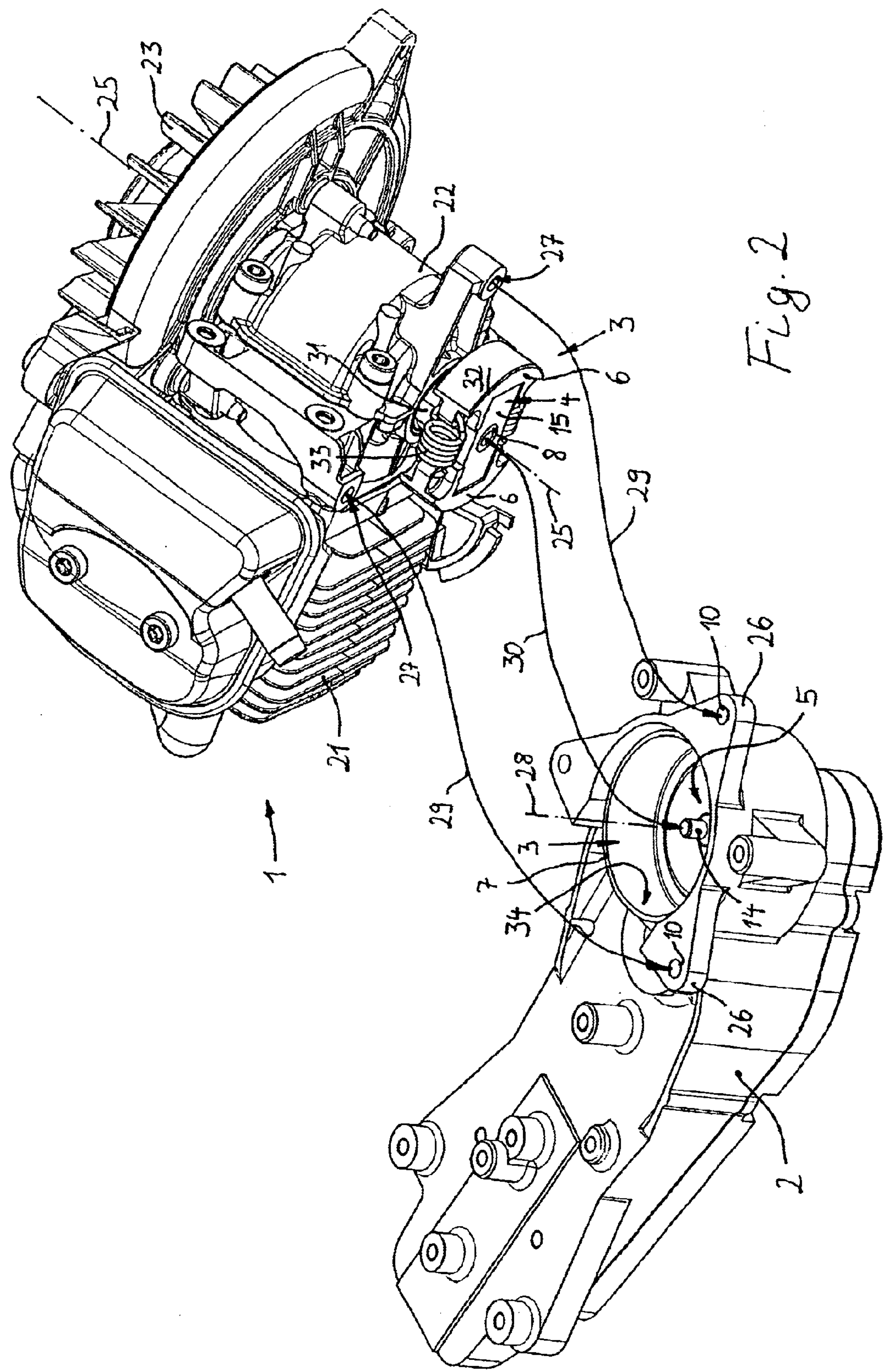
FIG. 2 shows the arrangement illustrated in FIG. 1 in a partially disassembled state.

FIG. 2 shows the arrangement illustrated in FIG. 1 in a partially disassembled state. A power take-off part 5 is mounted in the power-take off housing 2 in such a manner that it is able to rotate about an axis of rotation 28. The power take-off part 5 comprises a clutch housing 7 with an approximately cylindrical internal wall 34 and a locating pin 14. The clutch housing 7 and the locating pin 14 are coaxial to the axis of rotation 28 and are parts of a power take-off part 5 which is mounted in the power take-off housing 2. Provided in each of the three flanges 26 is a receiving opening 10 through which the fastening screws 18 (FIG. 1) can be passed.

From the side of the crankcase 22 of the internal combustion engine 1 facing towards the power take-off housing 2 and away from the cooling fan 23 projects a part 31 of the crankshaft to which is fixed a clutch support 15 with two clutch bodies 6 which lie opposite one another in relation to the crankshaft axis 25 and can be moved radially. The clutch bodies 6 are braced against each other by tension springs 33 and can be actuated by means of centrifugal force in such a manner that they are pushed radially outwards against the force of the tension springs 33 at a predetermined engine speed by virtue of their own mass. To this end external clutch linings 32 on the clutch bodies 6 lie against the internal wall 34 of the clutch housing 7 forming a frictional connection. The clutch support 15, the clutch bodies 6 with the tension springs 33 and the clutch housing 7 form a centrifugal clutch 3.

The clutch body 15, together with the clutch bodies 6 and the part 31 of the crankshaft, form a drive part 4 which is mounted in the internal combustion engine 1. In the embodiment illustrated it is mounted by means of crankshaft bearings (not illustrated). It can also be useful to provide a separate mounting in the region of the engine or a corresponding engine housing. In addition, it is also possible to provide a drive shaft or similar device in place of the crankshaft 31.

To mount the internal combustion engine 1 on the power take-off housing 2, the tapped holes 27 are guided along the arrow 29 to the receiving openings 10. The fastenings screws 18 which are passed through them form centering or locating pins 9 (FIG. 1) for the internal combustion engine 1 which project with play through the receiving holes 10. During assembly, a centering or locating bearing 8 held in the clutch support 15 is pushed over the locating pin 14. The drive part 4, which is coaxial to the crankshaft axis 25, is thus aligned along the same axis as the axis of rotation 28 of the power take-off part 5. The fastening screws 18 (FIG. 1) held with play in the receiving openings 10 can then be tightened in the tapped holes 27. In addition to the fastening screws 18, it is also possible to provide separate alignment pins, plugs, etc. with play.

Figure 3:
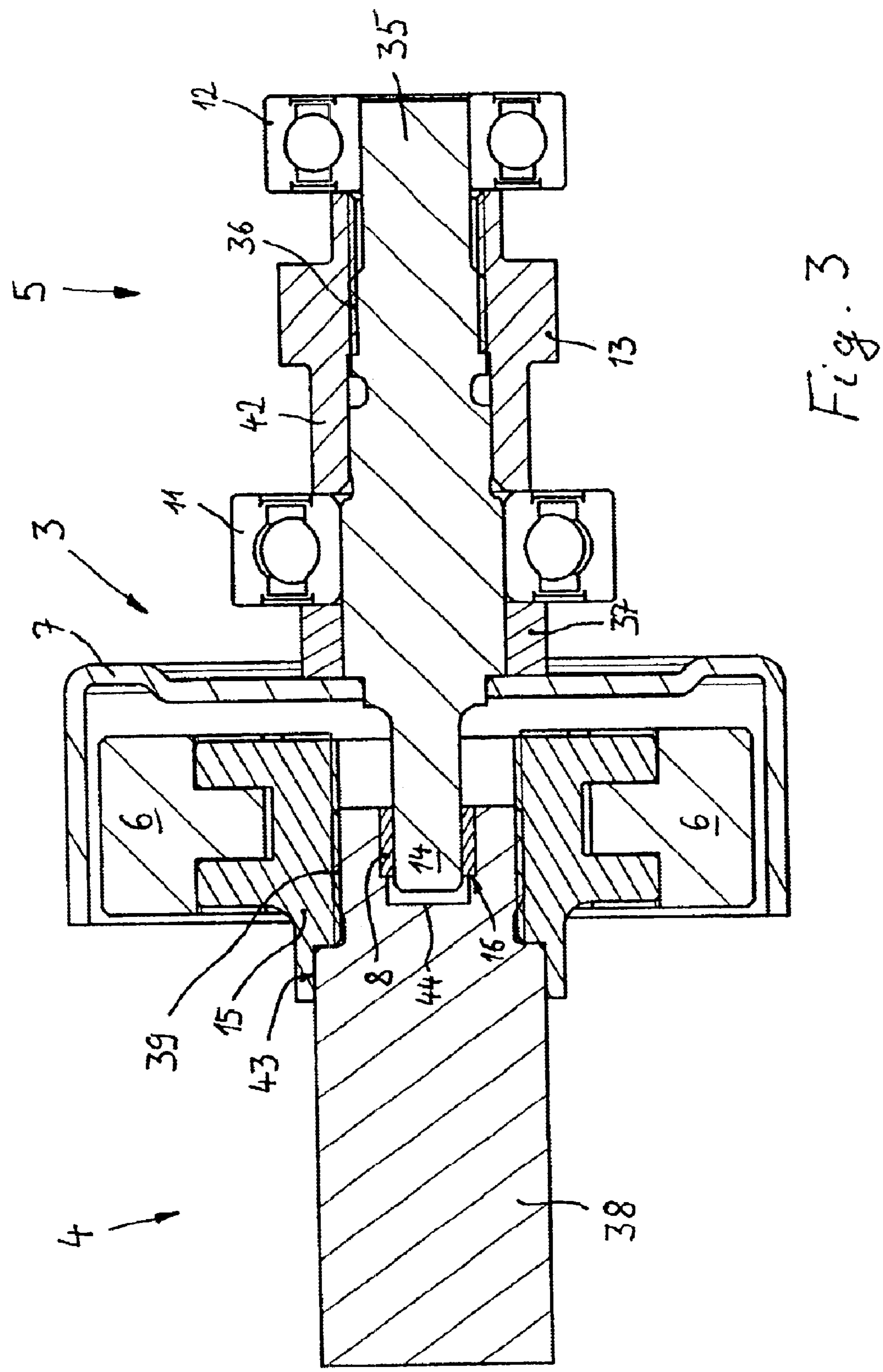
FIG. 3 shows a longitudinal sectional view through a centrifugal clutch with connected drive and power take-off parts and a locating bearing in the drive part.

FIG. 3 shows details of the centrifugal clutch 3 of the drive part 4 and the power take-off part 5 as shown in the arrangement illustrated in axial section in FIG. 2. It shows the locating bearing 8 which is provided between the drive part 4 and the power-take off part 5 with which it shares the same axis. In the embodiment illustrated, moreover, the locating bearing 8 is designed as a slide bearing 16 and is held in the drive part 4. The locating pin 14 is part of the power take-off part 5 and engages with the locating bearing 8. In the embodiment illustrated, the power take-off part 5 comprises a transmission output shaft 35 which is mounted in the power take-off housing 2 (FIG. 2) by means of two ball bearings 11, 12. When used in conjunction with the locating bearing 8 it can also be useful to provide only one of the two bearings 11, 12.

A sleeve 42 is placed over the transmission output shaft 35 and is connected by means of toothing 36 in such a manner that it cannot rotate. The sleeve 42 has a toothed power take-off 13 to transmit power towards the shear blade 20 (FIG. 1). The power take-off 13 can also be a square, a crank mechanism, a chain wheel, etc. Here the power take-off 13 is positioned approximately centrally between the two bearings 11, 12. The clutch housing 7 is fixed to the transmission output shaft 35 facing the drive part 4 in such a manner that it cannot rotate and separated from the bearing 11 by means of a spacer sleeve 37.

The drive part 4 comprises a drive shaft 38 which can be a separate gear shaft and forms part of the crankshaft 31 (FIG. 2) in the embodiment illustrated. The clutch support 15 is screwed onto the drive shaft 38 and aligned along the same axis as the drive shaft 38 by means of a locating collar 43. The two clutch bodies 6 run on the clutch support 15, the clutch housing 7 overlapping the clutch bodies 6. The drive shaft 38 has a hole 44 in the center of its front face in which the locating bearing 8 is held.

Figure 4:
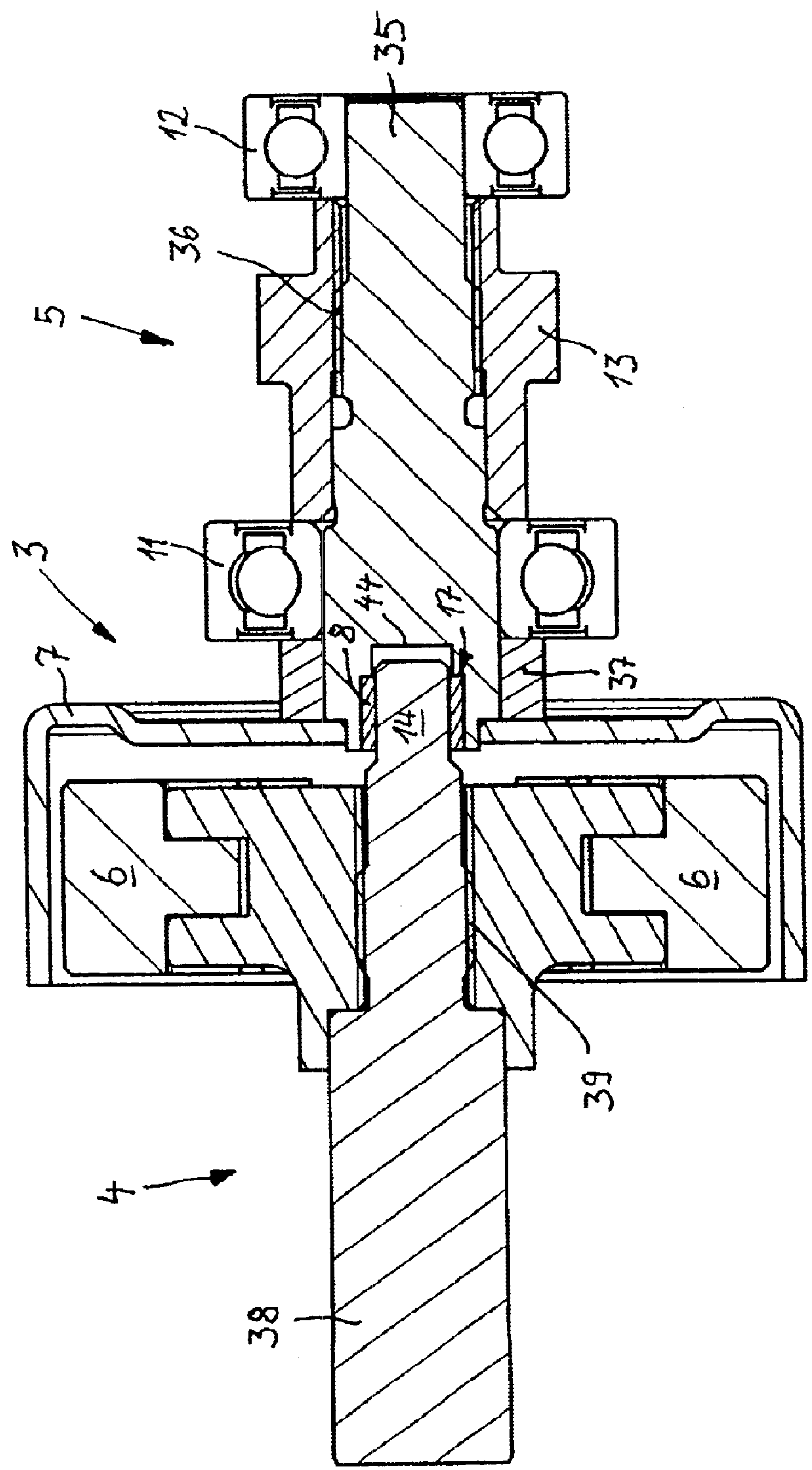
FIG. 4 shows a centrifugal clutch with a locating bearing in the power take-off part.

FIG. 4 shows a variant of the arrangement illustrated in FIG. 3 in which the hole 44 is positioned in the center of the front face of the transmission output shaft 35. Here the locating bearing 8 is held in this hole 44 in the power take-off part 5. The locating pin 14 is positioned on the side of the drive part 4 and designed as one piece with the drive shaft 38. In the embodiment illustrated, the locating bearing 8 is designed as a roller bearing 17, a needle roller bearing being particularly useful. The remaining features and reference numerals in the embodiment correspond to those shown in FIG. 3.

Figure 5:
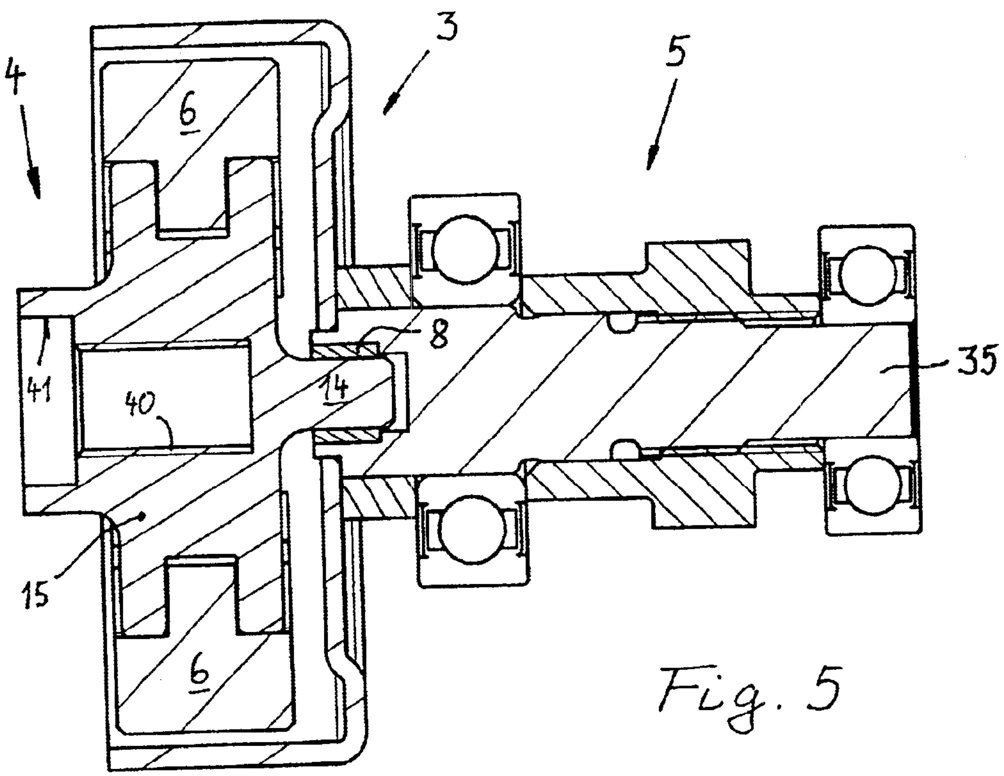
FIG. 5 shows a variant of the arrangement illustrated in FIG. 4 with a locating pin which is designed as one piece with the clutch support.

FIG. 5 shows a variant of the arrangement illustrated in FIG. 4 in which the locating pin 14 is designed as one piece with the clutch support 15. On the side facing away from the drive part 5, the clutch support 15 has an internal thread 40 and a locating hole 41 to fix it to and orient it in relation to a drive shaft 38 (FIG. 4).

Figure 6:
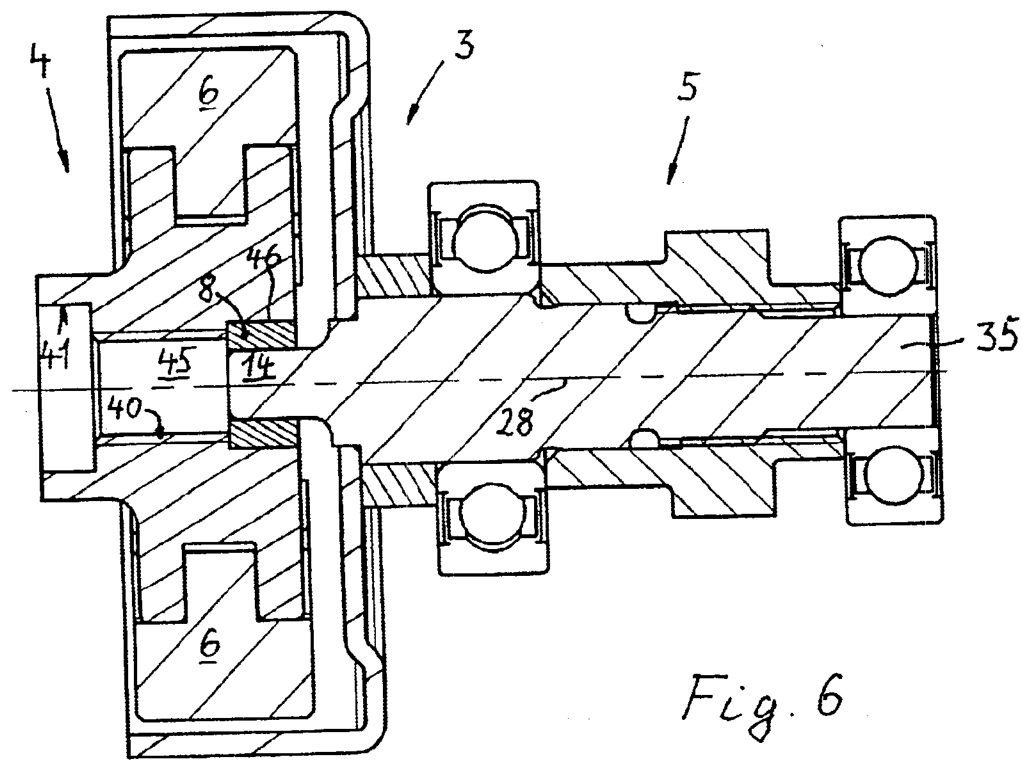
FIG. 6 shows a variant of the arrangement illustrated in FIG. 3 with a locating bearing fixed directly to the clutch support.

In the variant shown in FIG. 6, the clutch support 15 has a stepped hole 45 with the thread 40, the locating hole 41 and a bearing seat 46. The locating pin 14 is formed in one piece with the transmission output shaft 35 and engages in the locating bearing 8. Just as in the other embodiments illustrated, this effects the coaxial alignment of the drive and power take-off parts 4, 5 and the centrifugal clutch 3 together with all their related components and in relation to the axis of rotation 38 with great accuracy.

The specification incorporates by reference the disclosure of German priority document 101 61 908.1 filed Dec. 17, 2001.

The present invention is, of course, in no way restricted to the specific disclosure of the specification and drawings, but also encompasses any modifications within the scope of the appended claims.

What I claim is:

1. A manually guided implement having an internal combustion engine and a power take-off housing to which said engine is secured, said implement further comprising:

a centrifugal clutch for achieving a positive connection, as a function of engine speed, between a drive part thereof, which is driven by said engine and is rotatably mounted on an engine side, and a power take-off part thereof that is rotatably mounted in said housing, wherein said clutch is provided with at least one centrifugally actuatable clutch body in the region of said drive part, wherein said clutch is further provided, in the region of said power take-off part, with a clutch housing that overlaps said at least one clutch body, wherein said clutch is further provided with a locating bearing that is disposed between and coaxial with said drive part and said power take-off part, wherein said locating bearing is provided for a centering of said drive part and said clutch body relative to said power take-off part and said clutch housing during a mounting of said engine on said housing; and locating pins for aligning said engine relative to said housing, wherein said pins extend with play into appropriate receiving openings of at least one of said engine and said housing.

2. An implement according to claim 1, wherein two bearings are provided, and wherein said power take-off part is mounted in said housing via said bearings.

3. An implement according to claim 2, wherein said power take-off part is provided with a power take-off that is disposed between said two bearings.

4. An implement according to claim 1, wherein said locating bearing is held in said drive part, and wherein said power take-off part is provided with a locating pin that engages in said locating bearing.

5. An implement according to claim 4, wherein a clutch support is provided for guiding said at least one clutch body, and wherein said locating bearing is held in said clutch support.

6. An implement according to claim 1, wherein said locating bearing is held in said power take-off part, and wherein said drive part is provided with a locating pin that engages in said locating bearing.

7. An implement according to claim 6, wherein a clutch support is provided for guiding said at least one clutch body, and wherein said locating pin is monolithically formed with said clutch support.

8. An implement according to claim 1, wherein said locating bearing is a slide bearing.

9. An implement according to claim 1, wherein said locating bearing is a roller bearing.

10. An implement according to claim 1, wherein said locating pins are formed by fastening screws for said internal combustion engine.

* * * * *